US010961148B2

(12) United States Patent
Caillet et al.

(10) Patent No.: US 10,961,148 B2
(45) Date of Patent: Mar. 30, 2021

(54) GLAZING INCLUDING A STACK OF THIN LAYERS

(71) Applicant: SAINT-GOBAIN GLASS FRANCE, Courbevoie (FR)

(72) Inventors: Xavier Caillet, Fontenay sous Bois (FR); Andriy Kharchenko, Palaiseau (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 281 days.

(21) Appl. No.: 15/758,256

(22) PCT Filed: Sep. 5, 2016

(86) PCT No.: PCT/FR2016/052198
§ 371 (c)(1),
(2) Date: Mar. 7, 2018

(87) PCT Pub. No.: WO2017/042463
PCT Pub. Date: Mar. 16, 2017

(65) Prior Publication Data
US 2018/0244570 A1 Aug. 30, 2018

(30) Foreign Application Priority Data
Sep. 8, 2015 (FR) ..................... 1558308

(51) Int. Cl.
*B32B 15/04* (2006.01)
*B32B 17/06* (2006.01)
*C03C 17/36* (2006.01)
(52) U.S. Cl.
CPC .......... *C03C 17/3681* (2013.01); *C03C 17/36* (2013.01); *C03C 17/361* (2013.01);
(Continued)

(58) Field of Classification Search
CPC . B32B 17/06; B32B 2250/03; B32B 2255/20; B32B 2260/023; B32B 2250/05;
(Continued)

(56) References Cited

U.S. PATENT DOCUMENTS 5,821,001 A * 10/1998 Arbab ................ C03C 17/36
428/623
6,589,658 B1 * 7/2003 Stachowiak ........ C03C 17/36
428/426
(Continued)

FOREIGN PATENT DOCUMENTS

EP 1 734 019 A2 12/2006
WO WO 03/048061 A2 6/2003
(Continued)

OTHER PUBLICATIONS

International Search Report as issued in International Patent Application No. PCT/FR2016/052198, dated Nov. 3, 2016.

*Primary Examiner* — Lauren R Colgan
(74) *Attorney, Agent, or Firm* — Pillsbury Winthrop Shaw Pittman LLP

(57) ABSTRACT

A material includes a transparent substrate coated with a stack of thin layers including a silver-based functional metal layer and two dielectric coatings, wherein a lower dielectric coating located below a silver-based functional layer includes a high-index layer based on metal oxide, an antidiffusion layer based on silicon and/or on aluminum, at least one oxide-based layer located above the antidiffusion layer and exhibiting a different composition from the antidiffusion layer, such as a smoothing layer and/or a wetting layer.

16 Claims, 1 Drawing Sheet

Figure 1:
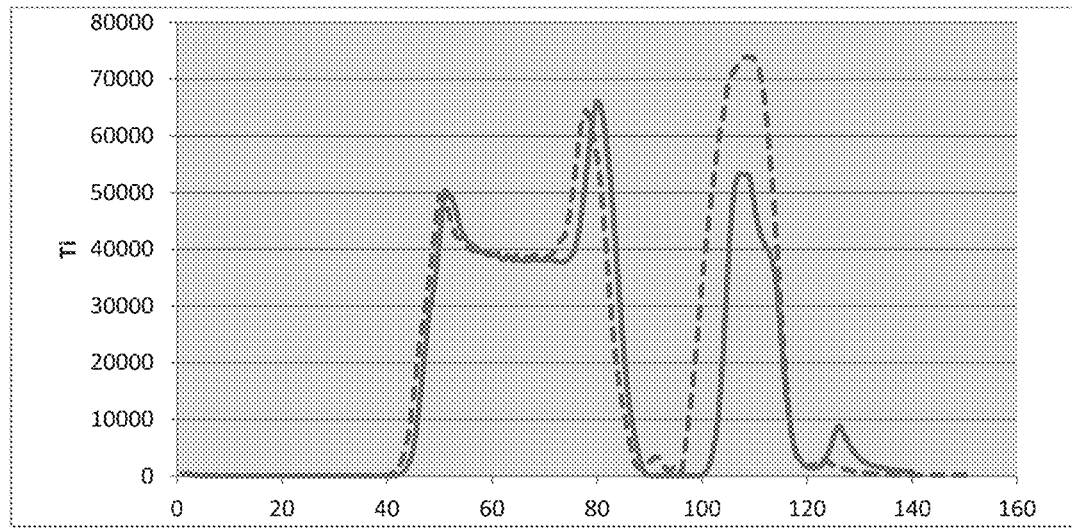

(52) U.S. Cl.
CPC ........ *C03C 17/366* (2013.01); *C03C 17/3626* (2013.01); *C03C 17/3636* (2013.01); *C03C 2217/734* (2013.01)

(58) Field of Classification Search
CPC ... B32B 2255/28; C03C 17/36; C03C 17/361; C03C 17/3626; C03C 17/3636; C03C 17/366; C03C 17/3644; C03C 17/3411; C03C 17/3618; C03C 17/3681; C03C 17/3435; C03C 17/3613; C03C 17/3652; C03C 2217/281; C03C 17/34; C03C 17/3642; C03C 17/3649; C03C 2217/70; G02B 1/113; G02B 1/115
USPC ................ 428/426, 428, 434, 688, 701, 702
See application file for complete search history.

(56) References Cited

U.S. PATENT DOCUMENTS

| | | | | |
|---|---|---|---|---|
| 6,830,817 B2 * | 12/2004 | Stachowiak | ............ | C03C 17/36 428/432 |
| 6,833,194 B1 * | 12/2004 | O'Shaughnessy | ............ | C03C 17/2453 428/432 |
| 8,337,988 B2 * | 12/2012 | Knoll | ............ | C03C 17/36 428/432 |
| 8,409,717 B2 * | 4/2013 | Lao | ............ | C03C 17/36 428/432 |
| 8,734,920 B2 * | 5/2014 | Frank | ............ | C03C 17/36 428/34 |
| 8,945,714 B2 * | 2/2015 | Lao | ............ | C03C 17/36 428/432 |
| 9,365,450 B2 * | 6/2016 | Ding | ............ | C03C 17/36 |
| 10,248,274 B2 * | 4/2019 | Krasnov | ............ | G06F 3/0416 |
| 2005/0042460 A1 * | 2/2005 | Kriltz | ............ | C03C 17/3644 428/432 |
| 2005/0191501 A1 * | 9/2005 | Lemmer | ............ | C03C 17/36 428/432 |
| 2009/0197077 A1 * | 8/2009 | Reutler | ............ | C03C 17/36 428/336 |
| 2012/0028009 A1 * | 2/2012 | Gerardin | ............ | C03C 17/3626 428/212 |
| 2013/0344321 A1 * | 12/2013 | McSporran | ............ | C03C 17/3618 428/336 |
| 2014/0022630 A1 * | 1/2014 | Reymond | ............ | C03C 17/36 359/360 |

FOREIGN PATENT DOCUMENTS

| WO | WO 2007/042688 A1 | 4/2007 |
|---|---|---|
| WO | WO 2007/101964 A1 | 9/2007 |
| WO | WO 2012/127162 A1 | 9/2012 |

* cited by examiner

GLAZING INCLUDING A STACK OF THIN LAYERS

CROSS-REFERENCE TO RELATED APPLICATIONS

This application is the U.S. National Stage of PCT/FR2016/052198, filed Sep. 5, 2016, which in turn claims priority to French patent application number 1558308 filed Sep. 8, 2015. The content of these applications are incorporated herein by reference in their entireties.

The invention relates to a material and to a process for obtaining a material, such as a glazing, comprising a transparent substrate coated with a stack of thin layers comprising a silver-based functional layer.

The invention more particularly relates to the use of such materials for manufacturing reinforced thermal insulation glazings exhibiting a high solar factor. Such glazings are, for example, intended for cold climates for equipping buildings, for the purpose in particular of reducing the heating strain in winter ("low-emissivity" glazings) and of maximizing the free solar contribution.

The solar factor g is defined as the ratio of the energy entering the premises via the glazing to the incident solar energy. It can be calculated by the sum of the energy flow transmitted directly through the glazing and of the energy flow absorbed and then re-emitted toward the inside by the glazing. The solar factor g, also known as SF coefficient, is measured within the meaning of the invention according to the conditions described in the international standard ISO 9050.

A type of stack of thin layers known to confer such thermal insulation properties is composed of a silver-based functional layer (or silver layer).

Silver-based functional layers are of use in several ways: by reflecting thermal or solar infrared radiation, they give the material low-emissivity or solar-control functions. Electrically conductive, they also make it possible to obtain conductive materials, for example heated glazings or electrodes.

Silver-based functional layers are deposited between coatings based on dielectric materials (hereinafter dielectric coating) which generally comprise several dielectric layers making it possible to adjust the optical properties of the stack and to retain a high transmission in the visible region. These dielectric layers additionally make it possible to protect the silver layers from chemical or mechanical attacks.

The application WO 2012/127162, which belongs to the applicant, discloses a material comprising a transparent substrate provided with a stack of thin layers comprising a silver layer positioned between two specific nonmetallic dielectric coatings which makes it possible to increase the solar factor of a glazing equipped with such a material and to obtain an acceptable coloration, in particular in transmission. To this end, the stack preferably comprises:
- a lower dielectric coating, located below the silver layer, comprising at least one layer having a high refractive index, made of material with a refractive index of greater than or equal to 2.20, exhibiting a thickness preferably of greater than 10 nm,
- an upper dielectric coating, located above the silver layer, comprising at least the sequence of thin high- and low-index layers deposited in the following order above the silver-based layer:
  - at least one layer having a high refractive index, made of material with a refractive index of greater than or equal to 2.20, the physical thickness of the layer having a high refractive index or the sum of the physical thicknesses of the layers having a high refractive index being between 15 and 40 nm,
  - at least one layer having a low refractive index, made of material with a refractive index of less than or equal to 1.70, the physical thickness of the layer having a low refractive index or the sum of the physical thicknesses of the layers having a low refractive index being between 40 and 120 nm.

These materials comprising thin high- and low-index layers advantageously exhibit a high solar factor, a high light transmission and acceptable colors in transmission and in reflection.

On the other hand, when these materials are subjected to high-temperature heat treatments, a variation in the colorimetric and optical properties, in particular an increase in the proportion of light scattered, which is not satisfactory for certain applications is often observed.

Subsequent to a heat treatment of tempering type, significant scattering of the light and also a variation in the colors which is particularly marked in reflection and also visible in transmission are observed. The phenomena of scattering of the light are expressed visually by the appearance of a light halo, known as "haze", visible generally under intense light.

The stability of the colorimetric and optical properties advantageously makes it possible to simultaneously use, in one and the same assembly, materials which have not been subjected to a heat treatment and others which have been subjected to a heat treatment, without the differences which may result therefrom being excessively obvious. Materials of this type may be described as matchable or temperable insofar as the variations in colors, before and after heat treatment, are not visible to the naked eye.

Consequently, the materials described in the application WO 2012/127162 do not exhibit, for certain applications, colorimetric and possibly optical properties which are sufficiently similar, before and after heat treatment, to be used jointly and thus to be described as matchable or temperable material. The esthetics of the materials before and after heat treatment is not sufficiently close.

There thus exists a need to develop a material exhibiting both:
  optical and colorimetric properties which are sufficiently similar, before and after heat treatment, and optionally
  a high solar factor, a high light transmission and acceptable colors in transmission and in reflection.

According to the present invention, materials exhibiting variations in the luminance factors subsequent to the heat treatment are not excluded from the definition of matchable material. However, it is preferable for the variations in the luminance factors subsequent to the heat treatment to remain as small as possible.

Consequently, the material of the invention has to be able to undergo a high-temperature heat treatment, such as an annealing, a bending and/or a tempering, without this treatment causing modifications within the stack of thin layers.

The properties of the silver-based stacks, such as the energy or optical performance levels, depend directly on the quality of the silver layers, such as their crystalline state or their homogeneity, and on their environment, for example on the nature of the layers located above and below. Furthermore, these properties also result from a precise control of the optical interference effects between the different layers making up the stack.

Solutions for improving the quality of the silver layers and in particular their crystallization were provided well before the filing of the application WO 2012/127162 disclosing stacks comprising in particular a sequence of thin high- and low-index layers.

For example, there are known, from the application WO 2007/042688, materials exhibiting a high light transmission comprising, in the lower dielectric coating, a high-index layer and a wetting layer. Such materials have the disadvantage of exhibiting a slight haze subsequent to a high-temperature heat treatment. In order to overcome this problem, the solution provided in the application WO 2007/042688 consists in using a dielectric coating located below the silver layer comprising:
  a high-index layer, for example a titanium dioxide layer,
  an antidiffusion layer based on mixed oxide of nickel and chromium ($NiCrO_x$) or of indium and tin ($InSnO_x$) located above the high-index layer,
  a wetting layer essentially composed of zinc oxide located above the antidiffusion layer.

The solution provided in this patent application for limiting the haze after heat treatment thus consists in using a lower dielectric coating, that is to say a coating located below a silver layer, comprising the sequence of following layers: a high-index layer/an antidiffusion layer based on specific mixed oxides/a wetting layer.

The materials described and exemplified in the application WO 2007/042688 do not comprise a sequence of high- and low-index layers in the upper dielectric coating.

The application WO 2007/101964 discloses, in the case where the dielectric coating located below the silver layer comprises at least one nitride-based dielectric layer, in particular based on silicon and/or aluminum nitride, the use of dielectric coatings comprising:
  wetting layers intended to promote the wetting and the nucleation of the silver layer, for example a layer based on crystalline zinc oxide,
  smoothing layers made of a mixed oxide located under the wetting layer, contributing to the appropriate growth of the silver layer above the wetting layer.

The layers based on silicon and/or aluminum nitride present in the dielectric coating located below the silver have a thickness of at least 10 nm, in particular of 30 nm and 20 nm in examples 2 to 4 (table 1).

According to the application WO 2007/101964, these materials make it possible to obtain satisfactory optical properties, whether or not the substrate is subjected to a heat treatment after deposition. However, the materials described and exemplified do not comprise sequences of high- and low-index layers.

In both these documents, all the thin layers of the upper dielectric coating, exhibiting a thickness of greater than 5 nm, have substantially the same refractive indices.

For this reason, the dielectric coatings composed of such thin layers form a medium of substantially homogeneous refractive index, although the materials of which they are composed are different.

According to the invention, two thin layers have substantially the same refractive indices when the absolute value of the difference between the refractive indices of the two materials constituting said layers at 550 nm is less than or equal to 0.15.

The applicant has discovered, surprisingly, that the variation in the optical properties, subsequent to a high-temperature heat treatment of tempering type, of the stacks comprising a lower dielectric coating comprising the sequence of following layers:
  a high-index layer,
  at least one oxide-based layer, such as a smoothing layer based on mixed oxides and/or a wetting layer,
is due to the interdiffusion of elements of the high-index layers and of the oxide layers, when the high-index layer exhibits a thickness of greater than 5 nm.

For example, in the case of a dielectric coating comprising the sequence of following layers: $TiO_x/SnZnO_x/ZnO$:
  the migration of tin and zinc toward the titanium oxide layer,
  the migration of titanium toward the mixed tin zinc oxide layer,
  the migration of oxygen from the tin zinc oxide layer toward the titanium oxide layer, is observed.

However, although this interdiffusion phenomenon occurs as soon as a high-temperature heat treatment is carried out, a significant variation in the colors only appears to be observed when the upper dielectric coating does not form a medium of homogeneous refractive index. A significant variation in the colors is present in particular when the upper dielectric coating comprises several layers with a thickness of greater than 5 nm, the difference in refractive index of which is at least greater than 0.30.

For example, when the upper dielectric coating is:
  essentially composed of a layer of silicon and/or aluminum nitride,
  composed of several layers of mixed tin zinc oxide and of silicon nitride, which materials have substantially the same refractive indices,
the refractive index of the dielectric coating is homogeneous and little diffusion is observed subsequent to the heat treatment. When the upper dielectric coating comprises a high- and low-index sequence, its refractive index is not homogeneous and a significant diffusion is observed subsequent to the heat treatment.

It thus appears that the interdiffusion phenomenon has a significant negative effect on the variations in colors when the layers making up the upper dielectric coating are composed of materials with different refractive indices.

In order to overcome this problem, the invention consists in adding a specific antidiffusion layer which prevents the interdiffusion of the elements of the high-index layers and of the oxide layers. This antidiffusion layer prevents the materials respectively making up these two layers from mixing, by blocking, for example, the diffusion of the titanium into the mixed tin zinc oxide layer and of the tin and zinc into the titanium oxide layer.

By preventing this phenomenon, it appears that the modification of the refractive indices of the layers making up the stack is averted, which modification is responsible for the colorimetric and possibly optical variations of light scattering type, rendering nonmatchable the products with and without heat treatment, for example tempered and nontempered.

The invention thus makes it possible to reduce the optical variations, subsequent to a high-temperature heat treatment of tempering type, due to the presence of a high-index layer, of an oxide layer, such as a smoothing layer based on mixed oxides, and/or of a wetting layer in one and the same dielectric coating.

The invention thus relates to a material comprising a transparent substrate coated with a stack of thin layers comprising a silver-based functional metal layer and two dielectric coatings, each dielectric coating comprising at least one dielectric layer, so that the functional metal layer is positioned between two dielectric coatings, characterized in that a lower dielectric coating located below a silver-based functional layer comprises:
- a high-index layer based on metal oxide, exhibiting a refractive index of greater than 2.3 and a thickness of greater than 5 nm,
- an antidiffusion layer based on silicon and/or on aluminum chosen from an oxide, a nitride and an oxynitride layer, located above the high-index layer, exhibiting a thickness of between 1 and 10 nm,
- at least one oxide-based layer located above the antidiffusion layer and exhibiting a different composition from the antidiffusion layer.

The invention also relates:
- to the process for obtaining a material according to the invention,
- to the glazing comprising at least one material according to the invention,
- to the use of a glazing according to the invention as thermal insulation glazing for the building industry or vehicles,
- to a building or a vehicle comprising a glazing according to the invention.

The solution of the invention comprises, in the lower dielectric coating:
- a high-index layer which makes it possible to obtain a high light transmission and contributes to a high solar factor being obtained,
- an antidiffusion layer, located between the oxide layer and the high-index layer, which makes it possible to reduce the optical variations subsequent to a high-temperature heat treatment.

The solution of the invention is particularly suitable when the upper dielectric coating does not form a medium of homogeneous refractive index. According to this embodiment, an upper dielectric coating located above a silver-based functional layer comprises at least two thin layers, each with a thickness of greater than 5 nm, the refractive index difference of which is greater than 0.30.

Although the antidiffusion layer makes it possible to considerably reduce the haze after heat treatment, variations in the electrical and thermal properties, such as an increase in the sheet resistivity, are sometimes observed. These variations may then be attributed not to variations in the refractive indices of the layers making up the dielectric coatings but to the appearance of defects in the silver layer subsequent to the heat treatment.

According to an advantageous embodiment, the dielectric coating located below the silver-based functional layer additionally comprises a high-index layer exhibiting a thickness of less than 5 nm located above the antidiffusion layer and below the silver-based functional layer. This layer is, according to the invention, known as "intermediate layer".

This intermediate layer is preferably located above the antidiffusion layer and below the oxide-based layers defined above. In contrast to the high-index layers with a thickness of more than 5 nm, an interdiffusion of elements capable of generating a significant light scattering subsequent to a heat treatment is not observed for these thicknesses. The composition of this high-index layer exhibiting a thickness of less than 5 nm is very obviously different from the composition of the antidiffusion layer and of the oxide-based layer.

Even if a certain amount of elements migrates from or into these high-index layers, the proportions are insufficient to modify the refractive indices of the layers where these migrations occur. Surprisingly, it turns out that the presence of such an intermediate layer limits the appearance of certain defects due to the heat treatment, such as the appearance of haze attributed to the growth of defects in the silver layer (dendrites or domes). A very good optical quality is obtained which can be attributed to the reduced detrimental change in the silver-based functional layer after heat treatment, while having very slight optical variations brought about by this heat treatment.

The invention is intentionally not limited to materials comprising, in the upper dielectric coating, a specific sequence of thin high- and low-index layers.

This is because the solution of the invention, which consists in optimizing the lower dielectric coating in order to prevent both the variation in the refractive indices of the dielectric layers of which it is composed and also optionally the appearance of defects in the silver layer during a heat treatment, is very particularly suitable when the upper dielectric coating comprises a sequence of high- and low-index layers. However, this solution may reasonably be suitable when the stacks comprise upper dielectric coatings with nonhomogeneous refractive indices.

The material, that is to say the transparent substrate coated with the stack, is intended to undergo a high-temperature heat treatment of tempering, annealing or bending type.

The material according to the invention is matchable or temperable in that the light absorption, light transmission and emissivity values are not substantially modified during the heat treatment.

The preferred characteristics which appear in the continuation of the description are applicable both to the process according to the invention and, if appropriate, to the product, that is to say to the material, before or after heat treatment.

All the light characteristics presented in the present description are obtained according to the principles and methods described in the European standard EN 410 relating to the determination of the light and solar characteristics of the glazings used in the glass for the construction industry.

The refractive indices are all measured, as usual, at a wavelength of 550 nm.

The term "thickness", without qualification, is understood to mean, within the meaning of the invention, the geometric or real physical thickness of the layer with its refractive index measured at 550 nm.

The term "optical thickness" is understood to mean, within the meaning of the invention, as usual, the product of the physical (or real) thickness of the layer with its refractive index measured at 550 nm.

The term "total optical thickness" is understood to mean, within the meaning of the invention, the sum of all the optical thicknesses of the layers under consideration, each optical thickness being, as explained above, the product of the physical (or real) thickness of the layer with its refractive index measured at 550 nm.

Thus, the total optical thickness of the antireflective coating consists of the sum of all the optical thicknesses of the dielectric layers constituting this coating.

The stack is deposited by magnetic-field-assisted cathode sputtering (magnetron process). According to this advantageous embodiment, all the layers of the stack are deposited by magnetic-field-assisted cathode sputtering.

Unless otherwise indicated, the thicknesses mentioned in the present document are physical thicknesses and the layers are thin layers. Thin layer is understood to mean a layer exhibiting a thickness of between 0.1 nm and 100 micrometers.

Throughout the description, the substrate according to the invention is regarded as being positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one or more layers inserted between these two layers.

The silver-based functional metal layer comprises at least 95.0%, preferably at least 96.5% and better still at least 98.0% by weight of silver, with respect to the weight of the functional layer. The silver-based functional metal layer preferably comprises less than 1.0% by weight of metals other than silver, with respect to the weight of the silver-based functional metal layer.

The thickness of the silver-based functional layer is, by increasing order of preference, from 5 to 20 nm, from 8 to 15 nm.

The stack of thin layers can comprise just one functional layer.

The silver-based functional metal layer can be protected by a layer described as blocking layer. According to this embodiment, the stack of thin layers additionally comprises at least one blocking layer located in contact with the functional metal layer chosen from metal layers, metal nitride layers, metal oxide layers and metal oxynitride layers based on one or more elements chosen from niobium Nb, tantalum Ta, titanium Ti, chromium Cr or nickel Ni or based on an alloy obtained from at least two of these metals, in particular on an alloy of nickel and chromium (NiCr). When these blocking layers are deposited in the metal, nitride or oxynitride form, these layers can undergo a partial or complete oxidation according to their thickness and the nature of the layers which frame them, for example, during the deposition of the following layer or by oxidation in contact with the underlying layer.

Preferably, the blocking layers are based on nickel and/or on chromium and are metal layers or metal oxide layers, preferably substoichiometric in oxygen.

According to an advantageous embodiment, the stack comprises a blocking layer located above and in contact with the silver-based functional metal layer. On the other hand, the stack preferably does not comprise a blocking layer located below and in contact with the silver-based functional metal layer.

Each blocking layer exhibits a thickness of between 0.1 and 5.0 nm. The thickness of these blocking layers is preferably:
of at least 0.1 nm or of at least 0.5 nm, and/or
of at most 5.0 nm or of at most 2.0 nm, of at most 1.0 nm.

An example of a stack suitable according to the invention comprises:
a lower dielectric coating, located below the silver-based functional metal layer,
a silver-based functional metal layer,
a blocking layer,
an upper dielectric coating, located above the silver-based functional metal layer,
optionally a protective layer.

The dielectric coatings exhibit a thickness of greater than 15 nm, preferably of between 15 and 100 nm.

The dielectric layers of the dielectric coatings exhibit the following characteristics, alone or in combination:
they are deposited by magnetic-field-assisted cathode sputtering,
they are chosen from the oxides, nitrides or oxynitrides of one or more elements chosen from titanium, silicon, aluminum, zirconium, tin and zinc,
they have a thickness of greater than or equal to 1 nm, preferably of between 5 and 100 nm.

The oxide-based layer or layers located above the antidiffusion layer in the lower dielectric coating can comprise a smoothing layer based on mixed oxides and/or a wetting layer.

The sum of the thicknesses of the oxide-based layers located above the antidiffusion layer in the lower dielectric coating is, by increasing order of preference:
greater than 3.0 nm, greater than 5.0 nm, greater than 8.0 nm, greater than 10 nm, greater than 12 nm, greater than 15 nm,
less than 50 nm, less than 40 nm, less than 30 nm, less than 20 nm.

Wetting layer is understood to mean a layer made of a material capable of stabilizing the interface with the functional layer. The wetting layers are based on zinc oxide, optionally doped using at least one other element, such as aluminum. The zinc oxide is crystalline. The layer based on zinc oxide comprises, by increasing order of preference, at least 90.0%, at least 92%, at least 95%, at least 98.0%, by weight of zinc, with respect to the weight of elements other than oxygen in the layer based on zinc oxide.

The wetting layers have, by increasing order of preference, a thickness:
of at least 3.0 nm, of at least 5.0 nm, and/or
of at most 25 nm, of at most 10 nm, of at most 8.0 nm.

The wetting layer can be directly in contact with the silver-based functional metal layer.

In an advantageous embodiment, at least one oxide-based layer located above the antidiffusion layer and exhibiting a different composition from the antidiffusion layer is a wetting layer, preferably based on zinc oxide, preferably located directly in contact with the silver-based metal layer.

Smoothing layer is understood to mean a layer, the function of which is to promote the growth of the wetting layer along a preferred crystallographic orientation which promotes the crystallization of the silver layer by epitaxia phenomena. The smoothing layer is located below and preferably in contact with a wetting layer.

The smoothing layer based on mixed oxide can be described as "noncrystalline" in the sense that it can be completely amorphous or partially amorphous and thus partially crystalline, but that it cannot be completely crystalline, over the whole of its thickness. It cannot be of metallic nature as it is based on mixed oxide (a mixed oxide is an oxide of at least two elements).

The crystallographic appearance of the smoothing layer is different from that of the wetting layer since the smoothing layer is noncrystalline whereas the wetting layer is essentially crystalline; they thus cannot be confused from this viewpoint. The advantage of such a smoothing layer is to make it possible to obtain an interface with the wetting layer which is not very rough. This low roughness can be observed with a transmission electron microscope. Furthermore, the wetting layer is textured better and additionally exhibits a more marked preferred crystallographic orientation.

Each smoothing layer is thus made of a different material, both from the crystallographic and from the stoichiometric viewpoint, from that of the wetting layer under which it is directly positioned.

The smoothing layer exhibits a different composition from the antidiffusion layer. This means that, in one and the same dielectric coating comprising a smoothing layer based on mixed oxide and an antidiffusion layer, these two layers do not comprise the same elements according to the same proportions.

Preferably, the smoothing layer is a layer of mixed oxide of at least two metals chosen from Sn, Zn, In and Ga. A preferred mixed oxide is tin zinc oxide. The smoothing layer is preferably an optionally doped layer of mixed tin zinc oxide.

The index of the smoothing layer is preferably less than 2.2. Furthermore, the smoothing layer preferably exhibits a thickness of between 0.1 and 30 nm and more preferably of between 0.2 and 10 nm.

The smoothing layers have, by increasing order of preference, a thickness:
of at least 0.5 nm, of at least 1.0 nm, of at least 5.0 nm, of at least 8.0 nm, and/or
of at most 25 nm, of at most 20 nm, of at most 15 nm.

According to an advantageous embodiment, the dielectric coating located below the silver-based functional layer comprises, as oxide-based layers:
a smoothing layer based on mixed oxide, preferably based on zinc and tin, located above the antidiffusion layer and exhibiting a different composition; preferably, the smoothing layer is either in contact with the antidiffusion layer or separated from the antidiffusion layer by a layer exhibiting a thickness of less than 5 nm, and/or
a wetting layer based on zinc oxide, located above the smoothing layer.

The smoothing layer and/or the wetting layer are advantageously directly in contact with the silver-based metal layer. This means that the stack does not comprise a blocking layer between these oxide layers and the silver-based metal layer.

Antidiffusion layer is understood to mean a layer made of a material capable of forming a barrier to the diffusion of elements originating from the layers in contact with it.

According to the invention, a layer based on silicon and/or on aluminum comprises, by increasing order of preference, at least 30%, at least 40%, at least 50%, at least 60%, at least 70%, at least 80%, at least 90.0%, by weight of silicon and/or of aluminum, with respect to the weight of elements other than oxygen and nitrogen in the layer based on silicon and/or on aluminum.

The antidiffusion layer based on silicon and/or on aluminum can be chosen from the layers:
of silicon oxide, such as $SiO_2$, of aluminum oxide, such as $Al_2O_3$, and of aluminum silicon oxide,
of silicon nitride, such as $Si_3N_4$, of aluminum nitride, such as AlN, of aluminum silicon nitride, such as $SiAlN_x$, of zirconium silicon nitrides, such as SiZrN,
of silicon oxynitrides, such as $SiO_xN_y$, of aluminum oxynitrides, such as $AlO_xN_y$, and of aluminum silicon oxynitrides.

Preferably, the antidiffusion layer based on silicon and/or on aluminum is chosen from a silicon nitride or zirconium silicon nitride layer.

The antidiffusion layer has a thickness:
of less than or equal to 10.0 nm, of less than or equal to 6.0 nm, of less than or equal to 5.0 nm or of less than or equal to 4.0 nm, and/or
of greater than or equal to 1.5 nm, of greater than or equal to 2.0 nm or of greater than or equal to 2.5 nm.

High-index layer is understood to mean a layer based on metal oxide, exhibiting a refractive index, measured at 550 nm, by increasing order of preference, of greater than 2.30, of greater than 2.35, of greater than 2.40.

The high-index layer based on metal oxide is chosen from layers based on titanium oxide, on zirconium oxide or on niobium oxide or layers of an alloy obtained from titanium and from another component chosen from the group consisting of Zn, Zr and Sn.

The thickness of the high-index layer or the sum of the thicknesses of the layers having a high refractive index exhibiting a thickness of greater than 5 nm which are located in the lower dielectric coating is, by increasing order of preference, between 5 and 100 nm, between 8 and 40 nm, between 10 and 30 nm, between 15 and 25 nm.

In the case where there are several layers having a high refractive index exhibiting a thickness of greater than 5 nm in the lower coating, the layers having a high refractive index are preferably all in direct contact with one another. However, if they are not in direct contact with one another, they are separated by a layer, the refractive index of which is neither less than or equal to 1.70 nor greater than or equal to 2.20, the physical thickness of this separating layer (each of these separating layers) being less than or equal to 30 nm, preferably less than or equal to 20 nm.

Advantageously:
the silver-based functional metal layer is located above and in contact with the wetting layer, and/or
the wetting layer is located above and in contact with the smoothing layer, and/or
the smoothing layer is located above and in contact with the antidiffusion layer or with a high-index layer exhibiting a thickness of less than 5 nm (or intermediate layer), and/or
the antidiffusion layer is located above and in contact with the high-index layer exhibiting a thickness of greater than 5 nm (or intermediate layer), and/or
the high-index layer exhibiting a thickness of greater than 5 nm is located above and in contact with the substrate.

The oxide-based layer or layers, such as the wetting layer and the smoothing layer, are either in contact with the antidiffusion layer or separated from the antidiffusion layer by an intermediate layer exhibiting a thickness of less than 5 nm.

According to an advantageous embodiment, the oxide-based layer, preferably the smoothing layer, is separated from the antidiffusion layer by an intermediate layer exhibiting a thickness of less than 5 nm chosen from the high-index layers. This intermediate layer is advantageously chosen from high-index layers based on metal oxide, such as are described above. The intermediate layer is in particular preferably chosen from layers based on titanium oxide.

The intermediate layer has, by increasing order of preference, a thickness:
of at least 1.0 nm, of at least 2.0 nm, and/or
of at most 5.0 nm, of at most 4.0 nm, of at most 3.0 nm.

This intermediate layer can be located:
above the antidiffusion layer and below the silver-based functional layer, and/or
above the antidiffusion layer and below at least one oxide layer, and/or
above the antidiffusion layer and below all the oxide layers, and/or
above the antidiffusion layer and below the smoothing layer based on mixed oxide, and/or
above the smoothing layer based on mixed oxide and below the wetting layer based on zinc oxide, and/or
above the wetting layer based on zinc oxide and below the silver-based functional layer.

The dielectric coating located below the silver-based functional metal layer can optionally comprise at least one dielectric layer, for example based on silicon and/or aluminum nitride, located above the substrate and below the high-index layer. One of the roles of this layer is to improve the adhesion of the stack of thin layers to the material of the substrate. This layer has a physical thickness of between 5 and 40 nm.

According to one embodiment, the invention relates to a material comprising a transparent substrate coated with a stack of thin layers comprising a silver-based functional metal layer and two dielectric coatings, each dielectric coating comprising at least one dielectric layer, so that the functional metal layer is positioned between two dielectric coatings, characterized in that:
a lower dielectric coating located below a silver-based functional layer comprises:
  a high-index layer based on metal oxide, exhibiting a refractive index of greater than 2.3 and a thickness of greater than 5 nm,
  an antidiffusion layer based on silicon and/or on aluminum chosen from an oxide, a nitride and an oxynitride layer, located above and in contact with the high-index layer, exhibiting a thickness of between 1 and 10 nm,
  a smoothing layer based on mixed tin zinc oxide, located above the antidiffusion layer, the smoothing layer being either in contact with the antidiffusion layer or separated from the antidiffusion layer by a layer exhibiting a thickness of less than 5 nm, and/or
  a wetting layer based on zinc oxide, located above the smoothing layer and below and preferably in contact with a silver-based metal layer,
an upper dielectric coating located above a silver-based functional layer comprising at least two thin layers, each with a thickness of greater than 5 nm, the refractive index difference of which is greater than 0.30.

According to another embodiment, the invention relates to a material comprising a transparent substrate coated with a stack of thin layers comprising a silver-based functional metal layer and two dielectric coatings, each dielectric coating comprising at least one dielectric layer, so that the functional metal layer is positioned between two dielectric coatings, characterized in that:
a lower dielectric coating located below a silver-based functional layer comprises:
  a high-index layer based on metal oxide, exhibiting a refractive index of greater than 2.3 and a thickness of greater than 5 nm,
  an antidiffusion layer based on silicon and/or on aluminum chosen from an oxide, a nitride and an oxynitride layer, located above and in contact with the high-index layer, exhibiting a thickness of between 1 and 10 nm,
  a high-index layer exhibiting a thickness of less than 5 nm located above the antidiffusion layer and below the silver-based functional layer,
  a smoothing layer based on mixed tin zinc oxide, located above the antidiffusion layer, preferably above the high-index layer exhibiting a thickness of less than 5 nm, and
  a wetting layer based on zinc oxide, located above the smoothing layer and below and in contact with a silver-based metal layer.

The upper dielectric coatings exhibit a thickness of greater than 15 nm, preferably of between 15 and 100 nm, indeed even of between 50 and 100 nm or between 75 and 100 nm.

The dielectric layers of the upper dielectric coatings exhibit the following characteristics, alone or in combination:
  they are deposited by magnetic-field-assisted cathode sputtering, and/or
  they are chosen from the oxides, nitrides or oxynitrides of one or more elements chosen from titanium, silicon, aluminum, zirconium, tin and zinc,
  they have a thickness of greater than or equal to 1 nm, preferably of between 5 and 100 nm.

Preferably, the upper dielectric coating does not form a medium of homogeneous refractive index. According to this embodiment, an upper dielectric coating comprises at least two thin layers, each with a thickness of greater than 5 nm, preferably with a thickness of greater than 10 nm, indeed even of greater than 15 nm, the refractive index difference of which is, by increasing order of preference, greater than 0.30, greater than 0.50, greater than 0.70, greater than 0.80.

The upper dielectric coating can thus comprise two thin layers, each with a thickness of greater than 5 nm, the refractive index difference of which is preferably between 0.30 and 1.20.

According to one embodiment, an upper dielectric coating comprises at least two thin layers, for which the refractive index difference between these two layers is: between 0.70 and 1.20.

According to another embodiment, an upper dielectric coating comprises thin layers with a thickness of greater than 5 nm, preferably of greater than 8 nm or 10 nm, for which the refractive index difference between all these layers is between 0.30 and 0.65.

Advantageously, the upper dielectric coating or coatings can comprise at least one layer having a low refractive index exhibiting a refractive index of less than or equal to 1.7, preferably of less than or equal to 1.6, indeed even of less than or equal to 1.5.

The physical thickness of the layer having a low refractive index of the upper dielectric coating or the sum of the physical thicknesses of the layers having a low refractive index of the upper dielectric coating is, by increasing order of preference, greater than 5 nm, greater than 8 nm, greater than 10 nm or greater than 15 nm, greater than 40 nm, greater than 50 nm, greater than 55 nm.

The physical thickness of the layer having a low refractive index of the upper dielectric coating or the sum of the physical thicknesses of the layers having a low refractive index of the upper dielectric coating is, by increasing order of preference, less than 120 nm, less than 100 nm, less than 80 nm, less than 70 nm.

The layers having a low refractive index are preferably silicon oxide layers, that is to say that they are composed, to more than 80% by weight, of silicon oxide, on the basis of the formulation of the simple oxide $SiO_2$, and optionally of at least one other element preferably chosen from the group consisting of Al, C, N, B, Sn and Zn and very preferably from Al, B or C. Preferably, said layers essentially composed of silicon oxide are composed, to more than 90% by weight, of silicon oxide, on the basis of the formulation of the simple oxide $SiO_2$.

The silicon oxide layers are deposited by cathode sputtering, optionally magnetic-field-assisted cathode sputtering.

According to one embodiment, an upper dielectric coating comprises at least two thin layers, each with a thickness of greater than 10 nm, one of which is a layer having a low refractive index, and for which the difference in refractive index between these two layers is:
  greater than 0.3, preferably greater than 0.5, or
  of between 0.30 and 0.65.

According to one embodiment, the upper dielectric coating or coatings located above the silver-based functional metal layer or layers can comprise at least one high-index layer. This high-index layer can be based on metal oxide and exhibit a thickness of greater than 5 nm. This high-index layer is as defined above.

According to this embodiment, the upper dielectric coating comprises at least one high-index layer based on metal oxide exhibiting a refractive index of greater than 2.2, preferably of greater than 2.3, and a thickness of greater than 5 nm, preferably of greater than 8 nm, indeed even of greater than 10 nm.

The physical thickness of the layer having a high refractive index or the sum of the physical thicknesses of the layers having a high refractive index located in the upper dielectric coating is between 10 and 40 nm, preferably between 15 and 35 nm.

The upper dielectric coating can comprise at least one dielectric layer exhibiting a refractive index of less than 2.2, preferably of less than 2.1, and a thickness of greater than 5 nm, preferably of greater than 8 nm, indeed even of greater than 10 nm. This layer is preferably located above the high-index layer defined above.

The dielectric layer exhibiting a refractive index of less than 2.2 can be chosen from the layers the oxides, the nitrides or the oxynitrides of one or more elements chosen from titanium, silicon, aluminum, zirconium, tin and zinc. Preferably, this layer is chosen from layers having a low refractive index, layers based on silicon and/or aluminum nitride and layers of mixed tin zinc oxides.

Advantageously, the upper dielectric layer or layers can comprise at least one high-index layer and one layer having a low refractive index. The layer having a low refractive index is preferably located above the layer having a high refractive index.

The refractive index difference between the layer or layers having a high refractive index and the layer or layers having a low refractive index of the upper dielectric coating is preferably between 0.70 and 1.20, preferably between 0.80 and 1.10.

According to an advantageous embodiment, the upper dielectric coating comprises at least the sequence of thin layers deposited in the following order above the functional layer:
at least one layer having a high refractive index, made of material with a refractive index of greater than or equal to 2.20, the physical thickness of the layer having a high refractive index or the sum of the physical thicknesses of the layers having a high refractive index being between 10 and 40 nm,
at least one layer having a low refractive index, made of material with a refractive index of less than or equal to 1.70, the physical thickness of the layer having a low refractive index or the sum of the physical thicknesses of the layers having a low refractive index being between 40 and 120 nm.

The use of this sequence of thin layers having high and low refractive indices in the upper dielectric coating contributes to a glazing being obtained which exhibits an enhanced solar factor and a low variation in color in reflection and in transmission subsequent to a high-temperature heat treatment.

In the case where there are several layers having a high refractive index in the upper coating, the layers having a high refractive index are preferably all below (starting from the glass) the layer or layers having a low refractive index and the layers having a high refractive index are preferably all in direct contact with one another. However, if they are not in direct contact with one another, they are separated by a layer, the refractive index of which is neither less than or equal to 1.70 nor greater than or equal to 2.20, the physical thickness of this (of each of these) separating layer(s) being less than or equal to 30 nm, preferably less than or equal to 20 nm.

Likewise, in the case where there are several layers having a low refractive index in the upper coating, the layers having a low refractive index are preferably all above (starting from the glass) the layer or layers having a high refractive index and the layers having a low refractive index are preferably all in direct contact with one another. However, if they are not in direct contact with one another, they are separated by a layer, the refractive index of which is neither less than or equal to 1.70 nor greater than or equal to 2.20, the physical thickness of this (of each of these) separating layer(s) being less than or equal to 30 nm, preferably less than or equal to 20 nm.

The layer or the group of layers having a high refractive index of the upper dielectric coating can be separated from the layer or the group of layers having a low refractive index of the upper dielectric coating by one or more other layers. However, preferably, the layers or groups of layers are in direct contact. In the case where the layers or groups of layers are not in direct contact, the layers or groups of layers are separated by a layer, the refractive index of which is neither less than or equal to 1.70 nor greater than or equal to 2.20, the physical thickness of this separating layer being less than or equal to 30 nm, preferably less than or equal to 20 nm.

In order to obtain a high solar factor and a low variation in the colors, it is advantageous for the ratio E of the physical thickness of the layer having a low refractive index or of the sum of the physical thicknesses of the layers having a low refractive index to the physical thickness of the layer having a high refractive index or the sum of the physical thicknesses of the layers having a high refractive index of the upper dielectric coating to be between 2.5 and 5.0, preferably between 2.5 and 4.0. When E is between 3.0 and 5.0, the color in transmission is more neutral. The inventors have also shown that the solar factor is at a maximum when the ratio E is between 2.2 and 4.0.

The ratio of the physical thickness of the layer having a low refractive index or of the sum of the physical thicknesses of the layers having a low refractive index to the physical thickness of the layer having a high refractive index or the sum of the physical thicknesses of the layers having a high refractive index of the upper dielectric coating is between 2.2 and 5.0, preferably between 2.5 and 4.0.

In order to obtain a high solar factor and neutral colors in transmission, it is also advantageous for the ratio F of the total optical thickness of the upper dielectric coating to the total optical thickness of the lower dielectric coating to be between 1.3 and 2.0, preferably between 1.5 and 1.8.

The ratio of the total optical thickness of the upper dielectric coating to the total optical thickness of the lower coating is, by increasing order of preference, between 1.3 and 2.0, between 1.4 and 1.9, between 1.5 and 1.8.

The upper dielectric coating can comprise a layer made of material with a refractive index of less than or equal to 2.20 and of greater than or equal to 1.80, positioned between the functional metal layer and the layer having a high refractive index of the upper dielectric coating. The layer made of material with a refractive index of less than 2.20 and of greater than or equal to 1.80 is preferably based on zinc oxide, on tin oxide or on mixed tin zinc oxide. The layer made of material with a refractive index of less than or equal to 2.20 and of greater than or equal to 1.80 has a physical thickness of between 4 and 15 nm. Preferably, this layer is a layer based on zinc oxide located above the functional metal layer, the thickness of which is preferably at least 4 nm, in particular between 4 and 25 nm and better still from 5 to 10 nm.

According to an advantageous embodiment, the upper dielectric coating located above the silver-based functional metal layer comprises:
- a layer based on zinc oxide,
- a high-index layer,
- a layer exhibiting a refractive index of less than 2.2, preferably a low-index layer.

The stack of thin layers can optionally comprise a protective layer. The protective layer is preferably the final layer of the stack, that is to say the layer furthest from the substrate coated with the stack (before heat treatment). These layers generally have a thickness of between 2 and 10 nm, preferably 2 and 5 nm. This protective layer can be chosen from a layer of titanium, of zirconium, of hafnium, of zinc and/or of tin, this or these metals being in the metal, oxide or nitride form.

According to one embodiment, the protective layer is based on zirconium and/or titanium oxide, preferably based on zirconium oxide or on titanium zirconium oxide.

The transparent substrates according to the invention are preferably made of a rigid inorganic material, such as made of glass, or are organic, based on polymers (or made of polymer).

The transparent organic substrates according to the invention, which are rigid or flexible, can also be made of polymer. Examples of polymers suitable according to the invention comprise, in particular:
- polyethylene;
- polyesters, such as polyethylene terephthalate (PET), polybutylene terephthalate (PBT) or polyethylene naphthalate (PEN);
- polyacrylates, such as polymethyl methacrylate (PMMA);
- polycarbonates;
- polyurethanes;
- polyamides;
- polyimides;
- fluoropolymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEPs);
- photocrosslinkable and/or photopolymerizable resins, such as thiolene, polyurethane, urethane-acrylate or polyester-acrylate resins, and
- polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

The substrate advantageously has at least one dimension greater than or equal to 1 m, indeed even 2 m and even 3 m. The thickness of the substrate generally varies between 0.5 mm and 19 mm, preferably between 0.7 and 9 mm, in particular between 2 and 8 mm, indeed even between 4 and 6 mm. The substrate can be flat or bent, indeed even flexible.

The material, that is to say the transparent substrate coated with the stack, is intended to undergo a high-temperature heat treatment chosen from an annealing, for example by a flash annealing, such as a laser or flame annealing, a tempering and/or a bending. The temperature of the heat treatment is greater than 300° C., preferably greater than 400° C. and better still greater than 500° C. The substrate coated with the stack can thus be bent and/or tempered.

The material can be in the form of a monolithic glazing, of a laminated glazing or of a multiple glazing, in particular a double glazing or a triple glazing. The invention thus also relates to a glazing comprising at least one material the invention fitted in a monolithic glazing or in a multiple glazing of the double glazing type or laminated glazing. At least the substrate coated with the stack can be bent or tempered.

A double glazing is composed of at least two substrates, for example glass sheets, separated pairwise by a gas-filled cavity. There is thus denoted, for example, by the sequence 4/12/4, a double glazing composed of two glass sheets with a thickness of 4 mm and of a 12-mm gas-filled cavity and, by 4/12/4/12/4, a triple glazing composed of three glass sheets with a thickness of 4 mm and of two 12-mm gas-filled cavities.

A double glazing thus comprises 4 faces; the face 1 is outside the building, the face 4 is inside the building and the faces 2 and 3 are inside the double glazing. Likewise, a triple glazing comprises 6 faces: the face 1 is outside the building, the face 6 is inside the building, the faces 2 and 3 are on each side of the first gas-filled cavity, inside the triple glazing, and the faces 4 and 5 are on each side of the second gas-filled cavity, inside the triple glazing.

These materials can furthermore be incorporated in glazings additionally exhibiting specific functionalities, such as, for example, heated glazings.

The invention also relates to a process for obtaining a material comprising a transparent substrate coated with a stack of thin layers according to the invention. The thin layers are deposited by cathode sputtering, optionally magnetic-field-assisted cathode sputtering. Preferably, a high-temperature heat treatment of the bending, tempering or annealing type is carried out on said substrate. The process can thus additionally comprise the stage during which said substrate undergoes a high-temperature heat treatment of the bending, tempering or annealing type.

This heat treatment can be carried out at a temperature of greater than 300° C. or of greater than 400° C., preferably of greater than 500° C.

During a treatment of tempering or annealing type carried out in an oven, respectively a tempering or annealing oven, the whole of the material, thus including the substrate, is brought to a high temperature of at least 300° C., in the case of the annealing, and of at least 500° C., indeed even 600° C., in the case of a tempering.

The material of the invention is suitable in all applications requiring the use of a low-emissivity stack comprising silver layers for which a high solar factor, a low emissivity and a good light transmission are key parameters. The materials according to the invention are suitable in particular as temperable low-emissivity materials exhibiting a low variation in colors subsequent to a high-temperature heat treatment or as low-emissivity materials to be tempered exhibiting a low haze after tempering.

The examples which follow illustrate the invention without, however, limiting it.

EXAMPLES

Several types of stacks of thin layers defined below are deposited on substrates made of clear soda-lime glass with a thickness of 3.9 mm, in a known way, on a cathode sputtering line (magnetron process) in which the substrate will progress forward under different targets.

For these examples, the conditions for deposition of the layers deposited by sputtering ("magnetron cathode" sputtering) are summarized in table 1 below.

TABLE 1

| | Targets employed | Deposition pressure | Gas | Index |
|---|---|---|---|---|
| $Si_3N_4$ | Si:Al (92:8% by wt) | $2\text{-}15 * 10^{-3}$ mbar | Ar 47% - $N_2$ 53% | 2.00 |
| $ZrO_2$ | $ZrO_2$ | $8 * 10^{-3}$ mbar | Ar 90% - $O_2$ 10% | 2.1 |
| SiZrAlN | Si:Al:Zr (70:8:22 at. %) | $2 * 10^{-3}$ mbar | Ar 55% - $N_2$ 45% | 2.22 |
| $SnZnO_x$ | Sn:Zn (60:40% by wt) | $1.5 * 10^{-3}$ mbar | Ar 39% - $O_2$ 61% | 2.09 |
| ZnO | ZnAlO (98:2% by wt) | $1.5 * 10^{-3}$ mbar | Ar 91% - $O_2$ 9% | 2.04 |
| Ag | Ag | $8 * 10^{-3}$ mbar | 100% Ar | — |
| NiCr | Ni:Cr (80:20 at. %) | $2 * 10^{-3}$ mbar | 100% Ar | — |
| $SiO_2$ | Si:Al (92:8% by wt) | $2\text{-}5 * 10^{-3}$ mbar | Ar 70% - $O_2$ 30% | 1.55 |
| $TiO_2$ | $TiO_x$ | $1.5 * 10^{-3}$ mbar | Ar 88% - $O_2$ 12% | 2.32 | at.: atomic;
wt: weight;
Index: at 550 nm.

Table 1 shows, for each material tested, the physical thicknesses of the layers of the stack, expressed in nm (unless otherwise indicated). The first line corresponds to the layer furthest from the substrate, in contact with the open air.

The materials provided with the stack are subjected to a heat treatment of tempering type which consists in particular in heating at 620° C. for 10 minutes.

I. Evaluation of the Matchable Nature

The matchable nature according to the invention is characterized by the absence of variation, before and after heat treatment:
  in the scattering, which is reflected by the absence of haze or of defects,
  in the colors.

For each material described in tables 2 and 3, observations which make it possible to evaluate the haze, the defects and the colorimetric variations have been listed.

These evaluations give accounts of variations due to the high-temperature heat treatment.

1. Evaluation of the Scattering by Measurement of the Haze

The phenomena of scattering of the light are expressed visually by the appearance of a light halo, known as "haze", visible generally under intense light.

The haze was assessed visually by a panel of several people who observe the presence or absence of a white veil or light halo appearing after heat treatment. The panel assigned, for each glazing, an assessment indicator chosen from:
"–": presence of a pronounced white veil expressing strong scattering,
"0": slight white veil expressing weak scattering,
"+": absence of white veil expressing the absence of scattering.

The haze corresponds to the amount of the transmitted light which is scattered at angles of more than 2.5°. This haze can also be evaluated by measurement of the mean visible diffuse reflection with the Perkin-Elmer L900 spectrometer. The measurement consists in taking the mean of the scattered part of the reflection over the visible region, the specular reflection being excluded from the measurement and the base line taken on a non-haze reference sample being subtracted. It is expressed as percentage with respect to a total reflection measured on a reference mirror.

2. Evaluation of the Presence of Defects in the Silver Layer

The analysis by optical microscopy or by scanning electron microscopy makes it possible to demonstrate the presence of defects after heat treatment.

The following assessments are reported after microscopic observation:
"–": Presence of numerous defects in the silver layer,
"0": Presence of a few defects in the silver layer,
"+": Absence of defects,
"X": No information available.

Finally, the type of defect is described in the following way:
"D": defect of "dome" type,
"H": defect of "hole" type,
"0": No defect visible,
"X": No information available.

3. Evaluation of Colorimetric Variations

The colorimetric variations in transmission and in reflection before and after heat treatment were evaluated visually by a panel of several people. The panel assigned, for each glazing, an assessment indicator chosen from:
"–": variations in color visible to the eye, rendering the material nonmatchable,
"0": slight variations in color, not rendering the material nonmatchable,
"+": no variation in color visible to the eye, material matchable.

TABLE 2

| | | Glazing | | | | | | | | |
|---|---|---|---|---|---|---|---|---|---|---|
| | | Cp. 0 | Cp. 1 | Cp. 2 | Cp. 2' | Cp. 2" | Cp. 2'" | Cp. 3 | Cp. 3' | Cp. 3" |
| Protective layer Upper DC | $ZrO_2$ | 2.5 | 2.5 | 2.5 | 2.5 | 2.5 | 2.5 | 2.5 | 2.5 | 2.5 |
| Dielectric layer | $Si_3N_4$ | 37 | – | 37 | 37 | 37 | 20 | – | – | – |
| | SnZnO | – | – | – | – | – | 17 | – | – | – |
| Low-index layer | $SiO_2$ | – | 62 | – | – | – | – | 60 | 60 | 62 |
| High-index layer | $TiO_x$ | – | 20 | – | – | – | – | 20 | 20 | 20 |
| Dielectric layer | ZnO | 7 | 7 | 5 | 5 | 5 | 5 | 5 | 5 | 7 |
| Blocking layer | NiCr | 0.5 | 0.5 | 1 | 1 | 1 | 1 | 1 | 1 | 0.5 |
| Functional layer | Ag | 9.2 | 9.2 | 9 | 9 | 9 | 9 | 9 | 9 | 9.2 |

TABLE 2-continued

| | | \multicolumn{9}{c}{Glazing} | | | | | | | | |
|---|---|---|---|---|---|---|---|---|---|
| | | Cp. 0 | Cp. 1 | Cp. 2 | Cp. 2' | Cp. 2" | Cp. 2''' | Cp. 3 | Cp. 3' | Cp. 3" |
| Lower DC | | | | | | | | | | |
| Wetting layer | ZnO | 6 | 6 | 5 | – | 5 | 5 | 5 | – | 6 |
| Smoothing layer | SnZnO | 23 | 23 | – | 10 | 10 | 10 | – | 10 | 18 |
| Intermediate layer | TiO$_x$ | – | – | – | – | – | – | – | – | – |
| Antidiffusion layer | SiZrN | – | – | – | – | – | – | – | – | – |
| | Si$_3$N$_4$ | – | – | – | – | – | – | – | – | – |
| High-index layer | TiO$_x$ | 2 | 2 | 10 | 10 | 10 | 10 | 10 | 10 | 10 |
| Dielectric layer | Si$_3$N$_4$ | 6 | 6 | 5 | 5 | 5 | 5 | 5 | 5 | 6 |
| Substrate (mm) | Glass | 3.9 | 3.9 | 3.9 | 3.9 | 3.9 | 3.9 | 3.9 | 3.9 | 3.9 |
| Observations | | | | | | | | | | |
| Colorimetry | | + | + | + | + | + | + | – | – | – |
| Scattering | | + | + | 0 | 0 | 0 | 0 | – | – | – |
| Visual defects | | 0 | – | 0 | 0 | 0 | 0 | – | X | – |
| Type of defect | | D | X | H | D | D | D | H | X | H |

TABLE 3

| | | \multicolumn{13}{c}{Glazing} | | | | | | | | | | | | | |
|---|---|---|---|---|---|---|---|---|---|---|---|---|---|
| | | Inv. 1 | Inv. 1' | Inv. 1" | Inv. 2 | Inv. 2' | Inv. 2" | Inv. 4 | Inv. 4' | Inv. 5 | Inv. 5' | Inv. 6 | Inv. 6' | Inv. 7 |
| Protective layer | | – | – | – | – | – | – | – | – | – | – | – | – | – |
| Upper DC | | | | | | | | | | | | | | |
| Dielectric layer | Si$_3$N$_4$ | – | – | – | – | – | – | – | – | – | – | – | – | 37 |
| Low-index layer | SnZnO | – | – | – | – | – | – | 37 | 37 | – | – | – | – | – |
| | SiO$_2$ | 60 | 60 | 60 | 60 | 60 | 60 | – | – | 60 | 60 | – | – | – |
| High-index layer | TiO$_x$ | 20 | 20 | 20 | 20 | 20 | 20 | 20 | 20 | – | – | 20 | 20 | 20 |
| Dielectric layer | ZnO | 5 | 5 | 5 | 5 | 5 | 5 | 5 | 5 | 5 | 5 | 5 | 5 | 5 |
| Blocking layer | NiCr | 1 | 1 | 1 | 1 | 1 | 1 | 1 | 1 | 1 | 1 | 1 | 1 | 1 |
| Functional layer | Ag | 9 | 9 | 9 | 9 | 9 | 9 | 9 | 9 | 9 | 9 | 9 | 9 | 9 |
| Lower DC | | | | | | | | | | | | | | |
| Wetting layer | ZnO | 5 | – | 5 | 5 | – | 5 | 5 | 5 | 5 | 5 | 5 | 5 | 5 |
| Smoothing layer | SnZnO | – | 10 | 10 | – | 10 | 10 | 10 | 10 | 10 | 10 | 10 | 10 | 10 |
| Intermediate layer | TiO$_x$ | – | – | – | 2-3 | 2-3 | 2-3 | – | 2-3 | – | 2-3 | – | 2-3 | 2-3 |
| Antidiffusion layer | SiZrN | 3 | 3 | 3 | – | – | – | – | – | – | – | – | – | – |
| | Si$_3$N$_4$ | – | – | – | 3 | 3 | 3 | 3 | 3 | 3 | 3 | 3 | 3 | 3 |
| High-index layer | TiO$_x$ | 10 | 10 | 10 | 10 | 10 | 10 | 10 | 10 | 10 | 10 | 10 | 10 | 10 |
| Dielectric layer | Si$_3$N$_4$ | 5 | 5 | 5 | 5 | 5 | 5 | 5 | 5 | 5 | 5 | 5 | 5 | 5 |
| Substrate (mm) | Glass | 3.8 | 3.8 | 3.8 | 3.8 | 3.8 | 3.8 | 3.8 | 3.8 | 3.8 | 3.8 | 3.8 | 3.8 | 3.8 |
| Observations | | | | | | | | | | | | | | |
| Colorimetry | | + | + | + | + | + | + | + | + | + | + | + | + | + |
| Scattering | | 0 | 0 | 0 | + | + | + | 0 | + | 0 | + | 0 | + | + |
| Visual defects | | 0 | 0 | 0 | + | + | + | 0 | 0 | 0 | 0 | 0 | + | + |
| Type of defect | | D | X | D | X | X | 0 | X | X | X | X | X | X | X |

These examples show that scattering visible to the eye is not observed:
- in the absence of a high-index layer or of a sequence of high- and low-index layers in the upper dielectric coating and in the absence of a high-index layer with a thickness of greater than 5 nm in the lower dielectric coating (Cp. 0),
- in the presence of a sequence of high- and low-index layers in the upper dielectric coating, without a high-index layer with a thickness of greater than 5 nm in the lower dielectric coating (Cp. 1).

For this, a basis may be taken on Cp. 0 and Cp. 1 in comparison with Cp. 3".

Significant variations in optical and colorimetric properties are observed that when:
- the lower dielectric coating comprises a high-index layer of more than 10 nm and
- the upper dielectric coating with a nonhomogeneous refractive index comprises layers with different refractive indices.

The dielectric coatings with nonhomogeneous refractive indices can be respectively composed of a sequence of layers with different indices, preferably based on oxide, such as:
- of a high-index TiO$_2$ layer and of a low-index SiO$_2$ layer,
- of a high-index layer and of a SnZnO$_x$ layer,
- of a ZnO layer and of a SiO$_2$ layer,
- of a ZnO layer and of a TiO$_2$ layer.

For this, it is possible to compare:
- example Cp. 2 (little scattering and no variation in color) with example Cp. 3 (scattering and variation in color),
- example Cp. 2' (little scattering and no variation in color) with example Cp. 3' (scattering and variation in color), example Cp. 2" (little scattering and no variation in color) with example Cp. 3" (scattering and variation in color).

The solution of the invention, which consists in adding an antidiffusion layer, for example based on silicon and/or aluminum nitride, located above the high-index layer and below the oxide layer, makes it possible to reduce the haze (improvement in the scattering from "−" to "0") and the colorimetric variations subsequent to a high-temperature heat treatment (improvement in the colorimetry from "−" to "+"). A few defects in the silver layer remain observable.

The even more advantageous solution, which consists in adding both an antidiffusion layer and a high-index intermediate layer exhibiting a thickness of less than 5 nm, located above the antidiffusion layer and below the silver-based functional layer, makes it possible to improve, in addition, the quality of the silver layer (improvement in the scattering from "−" to "+" and decrease in the defects).

For this, it is possible to compare:
example Cp. 3 with examples Inv. 1 and Inv. 2,
example Cp. 3' with examples Inv. 1' and Inv. 2',
example Cp. 3" with examples Inv. 1" and Inv. 2".

Some examples are combined in table 4 in order to make the advantages of the invention easier to understand.

TABLE 4

| | | Glazing | | | | | | | | |
|---|---|---|---|---|---|---|---|---|---|---|
| | | Cp. 3 | Inv. 1 | Inv. 2 | Cp. 3' | Inv. 1' | Inv. 2' | Cp. 3" | Inv. 1" | Inv. 2" |
| Protective layer | $ZrO_2$ | 2.5 | – | – | 2.5 | – | – | 2.5 | – | – |
| Upper DC | | | | | | | | | | |
| Dielectric layer | $Si_3N_4$ | – | – | – | – | – | – | – | – | – |
| | SnZnO | – | – | – | – | – | – | – | – | – |
| Low-index layer | $SiO_2$ | 60 | 60 | 60 | 60 | 60 | 60 | 62 | 60 | 60 |
| High-index layer | $TiO_x$ | 20 | 20 | 20 | 20 | 20 | 20 | 20 | 20 | 20 |
| Dielectric layer | ZnO | 5 | 5 | 5 | 5 | 5 | 5 | 7 | 5 | 5 |
| Blocking layer | NiCr | 1 | 1 | 1 | 1 | 1 | 1 | 0.5 | 1 | 1 |
| Functional layer | Ag | 9 | 9 | 9 | 9 | 9 | 9 | 9.2 | 9 | 9 |
| Lower DC | | | | | | | | | | |
| Wetting layer | ZnO | 5 | 5 | 5 | – | – | – | 6 | 5 | 5 |
| Smoothing layer | SnZnO | – | – | – | 10 | 10 | 10 | 18 | 10 | 10 |
| Intermediate layer | $TiO_x$ | – | – | 2-3 | – | – | 2-3 | – | – | 2-3 |
| Antidiffusion layer | SiZrN | – | 3 | – | – | 3 | – | – | 3 | – |
| | $Si_3N_4$ | – | – | 3 | – | – | 3 | – | – | 3 |
| High-index layer | $TiO_x$ | 10 | 10 | 10 | 10 | 10 | 10 | 10 | 10 | 10 |
| Dielectric layer | $Si_3N_4$ | 5 | 5 | 5 | 5 | 5 | 5 | 6 | 5 | 5 |
| Substrate (mm) | Glass | 3.9 | 3.8 | 3.8 | 3.9 | 3.8 | 3.8 | 3.9 | 3.8 | 3.8 |
| Observations | | | | | | | | | | |
| Colorimetry | | – | + | + | – | + | + | – | + | + |
| Scattering | | – | 0 | + | – | 0 | + | – | 0 | + |
| Visual defects | | – | 0 | + | X | 0 | + | – | 0 | + |
| Type of defect | | H | D | X | X | X | X | H | D | 0 |

II. Study of the Interdiffusion Phenomenon

The profiles of the element titanium in the comparative material Cp. 3" and in the material according to the invention Inv. 1" were determined in order to show the phenomenon of interdiffusion between the high-index layer and the oxide layer, such as the smoothing layer. The graphs illustrating these concentration profiles are obtained by SIMS (Secondary Ion Mass Spectrometry) and represent, on the abscissa, a measurement of depth D corresponding to the ion stripping and, on the ordinate, the concentration corresponding to the element titanium analyzed, in arbitrary units.

FIG. 1 represents, for the comparative material Cp. 3", the profile of the element titanium before (curve with continuous line) and after (curve with dotted line) heat treatment of tempering type. The migration of the titanium from the high-index layer toward the smoothing layer, corresponding to an offsetting toward the left of the curve obtained after heat treatment with respect to the curve obtained before heat treatment, is clearly observed.

Figure 2:
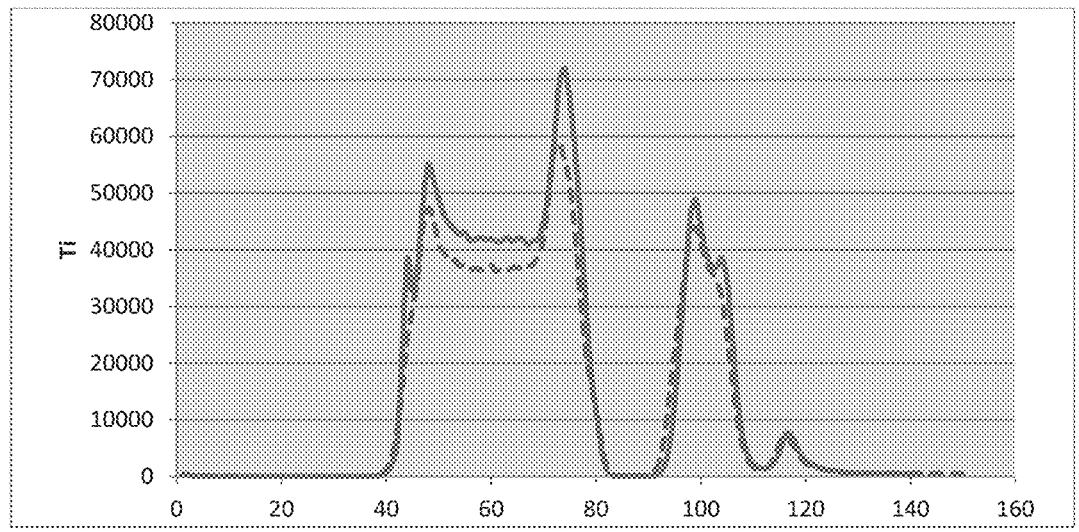

FIG. 2 represents, for a material according to the invention Inv. 1", the profile of the element titanium before (curve with continuous line) and after (curve with dotted line) heat treatment of tempering type. Clear migration of the titanium into the smoothing layer is not observed. The two curves are not significantly offset. The antidiffusion layer based on zirconium silicon nitride clearly prevents the migration of titanium from the high-index layer toward the smoothing layer.

III. Optical Performance Levels

The following characteristics were measured and combined in the table below:

LT indicates the light transmission in the visible region in %, measured according to the illuminant D65 at 2° Observer, ET corresponds to the energy transmission, ER corresponds to the energy reflection, g corresponds to the solar factor, L*T, a*T and b*T indicate the colors in transmission L*, a* and b* in the L*a*b* system, measured according to the illuminant D65 at 2°, observer on the side of the stack and measured thus perpendicularly to the glazing, LR indicates the light reflection in the visible region in %, measured according to the illuminant D65 at 2° Observer on the side of the stack or on the side of the substrate corresponding to the side opposite that of the stack, L*R, a*R and b*R indicate the colors in reflection L*, a* and b* in the L*a*b* system, measured according to the illuminant D65 at 2°, observer on the side of the stack or on the side of the substrate and measured thus perpendicularly to the glazing, ΔE represents the variation between the values L*, a* and b* which are obtained for a coated substrate, before and after having been subjected to a heat treatment. The variation is calculated in the following way: $\Delta E = (\Delta a^{*2} + \Delta b^{*2} + \Delta L^{*2})^{1/2}$.

These characteristics are measured for a material provided with the stack first at the outlet of the magnetron line and then after heat treatment of tempering type.

| | | Transmission | | | | | | |
|---|---|---|---|---|---|---|---|---|
| | | LT | ET | L*T | a*L | b*L | ΔEL | g |
| Cp. 0 | BT | 86.8 | 68.1 | 94.6 | −1.2 | 1.1 | 0.5 | 0.70 |
| | AT | 88.2 | 68.9 | 94.8 | −0.6 | 1.9 | | 0.70 |
| Cp. 0 | BT | 88 | 69.7 | 95.2 | −1.5 | 2.1 | 1.2 | − |
| | AT | 90.3 | 71.6 | 96.1 | −0.9 | 1.6 | | − |
| Cp. 3" | BT | 85.4 | 69.2 | 94.1 | −1.8 | 2.6 | 1.0 | − |
| | AT | 85.8 | 70.2 | 94.2 | −1.1 | 0.7 | | − |
| Cp. 3" | BT | 84 | − | 93.4 | −1.3 | 1.1 | 2.2 | − |
| | AT | 85.6 | − | 94.1 | −0.8 | −0.9 | | − |
| Inv. 1" | BT | 82.6 | − | 92.8 | −1.4 | 1.4 | 1.0 | − |
| | AT | 83.7 | − | 93.3 | −1.8 | 2.2 | | − |
| Inv. 2" | BT | 86.8 | 68.1 | 94.7 | −2.6 | 3.7 | 1.2 | 0.705 |
| | AT | 89.4 | 69.3 | 95.8 | −3 | 4.1 | | 0.698 |

BT: Before heat treatment,
AT: After heat treatment.

| | | Reflection stack side | | | | | | Reflection glass side | | | | |
|---|---|---|---|---|---|---|---|---|---|---|---|---|
| | | LR | ER | LR | a*R | b*R | ΔER | LR | ER | LR | a*R | b*R | ΔER |
| Cp. 0 | BT | 4.8 | 19.2 | 26.2 | 0.9 | −9.2 | 2.1 | 6.6 | 16.5 | 30.8 | −1.0 | −7.3 | 2.1 |
| | AT | 5.5 | 19.8 | 29.3 | −2.6 | −10.1 | | 7.7 | 17.2 | 33.3 | −3.6 | −8.1 | |
| Cp. 0 | BT | 5.1 | 18.6 | 27.1 | 0.6 | −8.2 | 2.1 | 6.4 | 16.4 | 30.5 | −0.1 | −8.6 | 1.4 |
| | AT | 5.4 | 20.1 | 27.7 | −1.4 | −8.5 | | 6.2 | 17.6 | 29.9 | −1.4 | −8.5 | |
| Cp. 3" | BT | 6.5 | 16.4 | 30.7 | 2.7 | −11.1 | 6.4 | 8.3 | 15.9 | 34.5 | 2.5 | 4.3 | 4.9 |
| | AT | 7.7 | 17 | 32.7 | −0.3 | −0.4 | | 9.3 | 16.2 | 36.5 | −0.5 | 4.1 | |
| Cp. 3" | BT | 8.7 | − | 35.4 | 1 | −3.6 | 8.5 | 10.2 | − | 38.2 | 1.1 | 1.1 | 4.8 |
| | AT | 10.1 | − | 37.9 | −0.4 | 4.4 | | 10.9 | − | 39.5 | −0.3 | 5.5 | |
| Inv. 1" | BT | 8.7 | − | 35.4 | 0.8 | 4.6 | 2.6 | 10.1 | − | 37.9 | 1.0 | 0.7 | 0.8 |
| | AT | 10.1 | − | 38 | 1 | 4.4 | | 10.4 | − | 38.5 | 0.4 | 0.7 | |
| Inv. 2" | BT | 4.4 | 18.6 | 24.9 | 8.2 | −16.8 | 0.9 | 5.5 | 15.3 | 28.1 | 5.9 | −15.2 | 2.6 |
| | AT | 4.6 | 19.7 | 25.6 | 8.6 | −16.4 | | 5.2 | 16 | 27.4 | 5.9 | −12.7 | |

These examples show that:
few colorimetric variations are not observed in the absence of a sequence of high- and low-index layers in the upper dielectric coating and in the absence of a high-index layer with a thickness of greater than 5 nm in the lower dielectric coating (Cp. 0),
significant variations are not observed in the presence of a sequence of high- and low-index layers in the upper dielectric coating and in the presence of a high-index layer with a thickness of greater than 5 nm in the lower dielectric coating (Cp. 3").
These colorimetric variations are greatly reduced by virtue of the antidiffusion layer based on silicon nitride, in particular a ΔE in reflection:
stack side, which decreases from more than 6 (Cp. 3") to 2.6 (Inv. 1") or 0.9 (Inv. 2"),
glass side, which decreases from approximately 5 (Cp. 3") to 0.8 (Inv. 1") or 2.6 (Inv. 2").
The example according to the invention 1" exhibits a high light transmission and slight colorimetric variations.
The example according to the invention 2", comprising both the antidiffusion layer and the intermediate layer, exhibits an even higher light transmission, slight colorimetric variations and a very high solar factor.

The invention claimed is:
1. A material comprising a transparent substrate coated with a stack of thin layers comprising a silver-based functional metal layer and two dielectric coatings, each dielectric coating comprising at least one dielectric layer, so that the functional metal layer is positioned between two dielectric coatings, wherein a lower dielectric coating located below a silver-based functional layer comprises:
a high-index layer based on metal oxide, exhibiting a refractive index of greater than 2.3 and a thickness of greater than 5 nm,
an antidiffusion layer based on silicon and/or on aluminum chosen from an oxide, a nitride and an oxynitride layer, located above the high-index layer, exhibiting a thickness of between 1 and 10 nm,
a high-index layer based on metal oxide exhibiting a refractive index of greater than 2.3 and a thickness of less than 5 nm located above and in contact with the antidiffusion layer and below the silver-based functional layer,
at least one oxide-based layer located above the antidiffusion layer and exhibiting a different composition from the antidiffusion layer, the at least one oxide-based layer being above and in contact with the high-index layer exhibiting a refractive index of greater than 2.3 exhibiting a thickness of less than 5 nm, a total thickness of the at least one oxide-based layer located above the antidiffusion layer and exhibiting a different composition from the antidiffusion layer being greater than 10 nm.
2. The material as claimed in claim 1, wherein an upper dielectric coating is located above the silver-based functional layer and comprises at least two thin layers, each with a thickness of greater than 5 nm, the refractive index difference of which is greater than 0.30.
3. The material as claimed in claim 2, wherein the upper dielectric coating comprises at least one high-index layer based on metal oxide exhibiting a refractive index of greater than 2.3 and a thickness of greater than 5 nm.
4. The material as claimed in claim 2, wherein the upper dielectric coating comprises at least one dielectric layer exhibiting a refractive index of less than 2.2 and a thickness of greater than 5 nm located above the high-index layer.
5. The material as claimed in claim 2, wherein the upper dielectric coating comprises at least one layer having a low refractive index exhibiting a refractive index of less than or equal to 1.7 and a thickness of greater than 5 nm.
6. The material as claimed in claim 2, wherein the upper dielectric coating comprises at least the sequence of thin layers deposited in the following order above the functional layer:
at least one layer having a high refractive index, made of material with a refractive index of greater than or equal to 2.20, a physical thickness of the layer having a high refractive index or a sum of the physical thicknesses of the layers having a high refractive index being between 10 and 40 nm, at least one layer having a low refractive index, made of material with a refractive index of less than or equal to 1.70, a physical thickness of the layer having a low refractive index or a sum of the physical thicknesses of the layers having a low refractive index being between 40 and 120 nm.

7. The material as claimed in claim 1, wherein the antidiffusion layer is located above and in contact with the high-index layer exhibiting a thickness of greater than 5 nm.

8. The material as claimed in claim 1, wherein at least one oxide-based layer located above the antidiffusion layer and exhibiting a different composition from the antidiffusion layer is a wetting layer based on zinc oxide.

9. The material as claimed in claim 8, wherein the wetting layer based on zinc oxide is located directly in contact with the silver-based metal layer.

10. The material as claimed in claim 1, wherein the dielectric coating located below the silver-based functional layer comprises, as oxide-based layers:
  a smoothing layer based on mixed oxide, located above the antidiffusion layer and exhibiting a different composition, the smoothing layer being either in contact with the antidiffusion layer or separated from the antidiffusion layer by a layer exhibiting a thickness of less than 5 nm, and
  a wetting layer based on zinc oxide, located above the smoothing layer.

11. The material as claimed in claim 10, wherein the smoothing layer is a layer of mixed oxide comprising one or more metals chosen from tin Sn, zinc Zn, gallium Ga and indium In.

12. The material as claimed in claim 1, wherein the high-index layers based on metal oxide are chosen from titanium oxide or niobium oxide layers or a layer of an alloy obtained from titanium and niobium.

13. The material as claimed in claim 1, wherein the antidiffusion layer is chosen from the layers:
  of silicon oxide, of aluminum oxide and of aluminum silicon oxide,
  of silicon nitride, of aluminum nitride, of aluminum silicon nitride, of zirconium silicon nitrides,
  of silicon oxynitrides, of aluminum oxynitrides and of aluminum silicon oxynitrides.

14. The material as claimed in claim 1, wherein the substrate is made of glass or of a polymeric organic substance.

15. The material as claimed in claim 14, wherein the glass is soda lime glass.

16. A process for obtaining a material comprising a transparent substrate coated with a stack of thin layers as claimed in claim 1, comprising depositing the thin layers by cathode sputtering, optionally magnetic-field-assisted cathode sputtering, wherein a high-temperature heat treatment of the bending, tempering or annealing type is carried out on said substrate.

* * * * *